United States Patent
Sugimoto et al.

(10) Patent No.: US 8,783,714 B2
(45) Date of Patent: Jul. 22, 2014

(54) AIRBAG APPARATUS

(75) Inventors: Kazutaka Sugimoto, Tokyo (JP); Hideo Namiki, Saitama (JP); Fujio Umebayashi, Saitama (JP); Takumi Makabe, Saitama (JP)

(73) Assignees: Takata Corporation, Tokyo (JP); Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/007,437

(22) PCT Filed: Dec. 27, 2011

(86) PCT No.: PCT/JP2011/080218
§ 371 (c)(1),
(2), (4) Date: Sep. 25, 2013

(87) PCT Pub. No.: WO2012/132158
PCT Pub. Date: Oct. 4, 2012

(65) Prior Publication Data
US 2014/0015235 A1    Jan. 16, 2014

(30) Foreign Application Priority Data
Mar. 31, 2011    (JP) ................. 2011-077464

(51) Int. Cl.
*B60R 21/26*    (2011.01)
*B60R 21/20*    (2011.01)

(52) U.S. Cl.
CPC .............. *B60R 21/26* (2013.01); *B60R 21/20* (2013.01)
USPC .......... 280/736; 280/741; 102/530; 102/531; 102/202.5; 102/202.12; 102/202.14

(58) Field of Classification Search
CPC .................. B60R 21/26; B60R 21/36; B60R 2021/26029; B60R 21/013; B60R 21/017; B60R 21/20
USPC ............... 280/736, 741; 102/530, 531, 202.5, 102/202.12, 202.14
See application file for complete search history.

(56) References Cited

U.S. PATENT DOCUMENTS 5,955,699 A * 9/1999 Perotto et al. ................. 102/530
6,164,208 A * 12/2000 Hsu et al. .................. 102/202.5

(Continued)

FOREIGN PATENT DOCUMENTS

JP    H02-155860 A    6/1990
JP    2005-308339 A    11/2005

(Continued)

OTHER PUBLICATIONS

International Search Report from the International Bureau of WIPO for International Application No. PCT/JP2011/080218 dated Apr. 17, 2012 (2 pages).

*Primary Examiner* — Ruth Ilan
*Assistant Examiner* — Darlene P Condra
(74) *Attorney, Agent, or Firm* — Fitch, Evan, Tabin & Flannery, LLP (57) ABSTRACT

An airbag apparatus is provided having an inflator in which the waterproofing property of the connection between an initiator and a harness for distributing power is ensured by potting, and leakage at the time of the filling of a potting material is prevented. An airbag apparatus includes a bag portion formed of a base cloth panel in a bag shape and deployed and inflated by being supplied with gas for deployment, and an inflator that generates the gas for deployment supplied to the bag portion. The inflator includes a gas-generating agent, an initiator that causes the gas-generating agent to start gas-generating reaction, a housing that houses the gas-generating agent and the initiator, a harness for distributing power that supplies power to the initiator from the outside through an opening formed in the housing, a cap member disposed so as to face the surface of the housing around the opening, an annular elastic member disposed so as to surround the opening and so as to be sandwiched between the surface of the housing and a surface portion of the cap member facing thereto, and a potting material P filled in a space between the housing and the cap member on the inner side of the elastic member.

2 Claims, 5 Drawing Sheets

(56) References Cited

U.S. PATENT DOCUMENTS

| | | | |
|---|---|---|---|
| 6,168,187 B1 * | 1/2001 | Yamada et al. | 280/728.3 |
| 6,474,684 B1 * | 11/2002 | Ludwig et al. | 280/741 |
| 7,396,040 B2 * | 7/2008 | Enders et al. | 280/730.1 |
| 2007/0266880 A1 * | 11/2007 | Takimoto | 102/202.7 |
| 2007/0266885 A1 * | 11/2007 | Takimoto | 102/530 |
| 2008/0084005 A1 * | 4/2008 | Steele et al. | 264/272.14 |

FOREIGN PATENT DOCUMENTS

| | | |
|---|---|---|
| JP | 2007-309546 A | 11/2007 |
| JP | 2007-309547 A | 11/2007 |
| JP | 2011-000962 A | 1/2011 |

* cited by examiner

FRONT OF VEHICLE

AIRBAG APPARATUS

CROSS-REFERENCE TO RELATED APPLICATIONS

This application is a U.S. national phase application filed under 35 U.S.C. §371 of International Application PCT/JP2011/080218, filed on Dec. 27, 2011, designating the United States, which claims priority from Japanese Patent Application No. 2011-077464, filed Mar. 31, 2011, which are hereby incorporated herein by reference in their entirety.

TECHNICAL FIELD

The present invention relates to an airbag apparatus provided in a saddle-ride type vehicle such as a motorcycle and having a bag portion that deploys and inflates in front of an occupant at the time of a collision or the like.

BACKGROUND ART

It is proposed to provide a saddle-ride type vehicle such as a motorcycle on the vehicle body of which an occupant such as a driver straddles to ride, with an airbag apparatus having a bag portion that deploys and inflates in front of the occupant to restrain the occupant at the time of a collision or the like.

For example, in Japanese Unexamined Patent Application Publication No. 2011-000962 A, there is described an airbag apparatus that houses a bag in a retaining box provided in front of an occupant's seat and that deploys and inflates the bag upward from the retaining box to restrain the upper body of an occupant at the time of a vehicle collision or the like.

In Japanese Unexamined Patent Application Publication No. 2011-000962 A, a front-opening lid having a hinge on the vehicle rear side thereof is provided on the top of the retaining box, and the bag portion is configured to inflate while push-opening this lid.

In general, an airbag apparatus deploys and inflates a bag portion with gas for deployment generated by a gas generator called an inflator. The inflator includes a gas-generating agent and an initiator that initiates the gas-generating reaction of the gas-generating agent.

The initiator includes a reaction agent, an ignition device for starting the reaction of the reaction agent, and a harness for distributing power.

However, in the case of an airbag apparatus for a saddle-ride type vehicle such as that described above, although a lid is provided on the top of a retaining box, in addition, it is required to improve the waterproofing property of the connection between an initiator and a harness for distributing power.

As a conventional art related to such waterproofing of the connection between an initiator and a harness for distributing power, for example, in Japanese Unexamined Patent Application Publication No. 2007-309546 A, it is described to provide an initiator-attaching member on the outer diameter side of a cylindrical collar into which an initiator is inserted, to extend a cylindrical cap member from the outer diameter side of this member to the harness for distributing power side, to fill a potting material on the inner diameter side of the cap member, to thereby bury a connector in the potting material, and to waterproof an area surrounding the connector, in a pedestrian protection airbag apparatus provided outside a cabin of an automobile such as a passenger car.

SUMMARY OF INVENTION

However, in the art described in Japanese Unexamined Patent Application Publication No. 2007-309546 A, if a gap is formed between the cap member and the initiator-attaching member owing to variation in dimensions and assembly of components and the like, leakage may occur at the time of the filling of the potting material.

It is an object of the present invention to provide an airbag apparatus having an inflator in which the waterproofing property of the connection between an initiator and a harness for distributing power is ensured by potting, and leakage at the time of the filling of a potting material is prevented.

In order to solve the above problem, an airbag apparatus of the present invention includes a bag portion formed of a base cloth panel in a bag shape and deployed and inflated by being supplied with gas for deployment, and an inflator that generates the gas for deployment, and is characterized in that the inflator includes a gas-generating agent, an initiator that causes the gas-generating agent to start gas-generating reaction, a housing that houses the gas-generating agent and the initiator, a harness for distributing power that supplies power to the initiator from the outside through an opening formed in the housing, a cap member disposed so as to face the surface of the housing around the opening, an annular elastic member disposed so as to surround the opening and so as to be sandwiched between the surface of the housing and a surface portion of the cap member facing thereto, and a potting material filled in a space between the housing and the cap member on the inner side of the elastic member.

According to this, the region filled with the potting material is restricted by the surface of the housing, the cap member, and the elastic member, the elastic member reliably seals the contact portion between the housing and the cap, leakage at the time of the filling of the potting material is thereby prevented, and the waterproofing property of the product is ensured by appropriate potting.

In the present invention, the elastic member may be a double-sided tape formed by applying a bonding agent or an adhesive to the housing side surface and the cap member side surface of a base material formed of a material having elasticity.

According to this, the housing and the cap can be temporarily fixed to each other at the time of assembly by the adhesive force of the double-sided tape, and the assembly workability is improved.

As described above, according to the present invention, it is possible to provide an airbag apparatus having an inflator in which the waterproofing property of the connection between an initiator and a harness for distributing power is ensured by potting, and leakage at the time of the filling of a potting material is prevented.

DETAILED DESCRIPTION OF THE PREFERRED EMBODIMENTS

Hereinafter, an embodiment of an airbag apparatus to which the present invention is applied will be described.

The airbag apparatus of the embodiment is provided, for example, on a motorcycle that is a saddle-ride type vehicle and includes a bag portion that deploys and inflates in front of an occupant at the time of a collision or the like.

Figure 1:
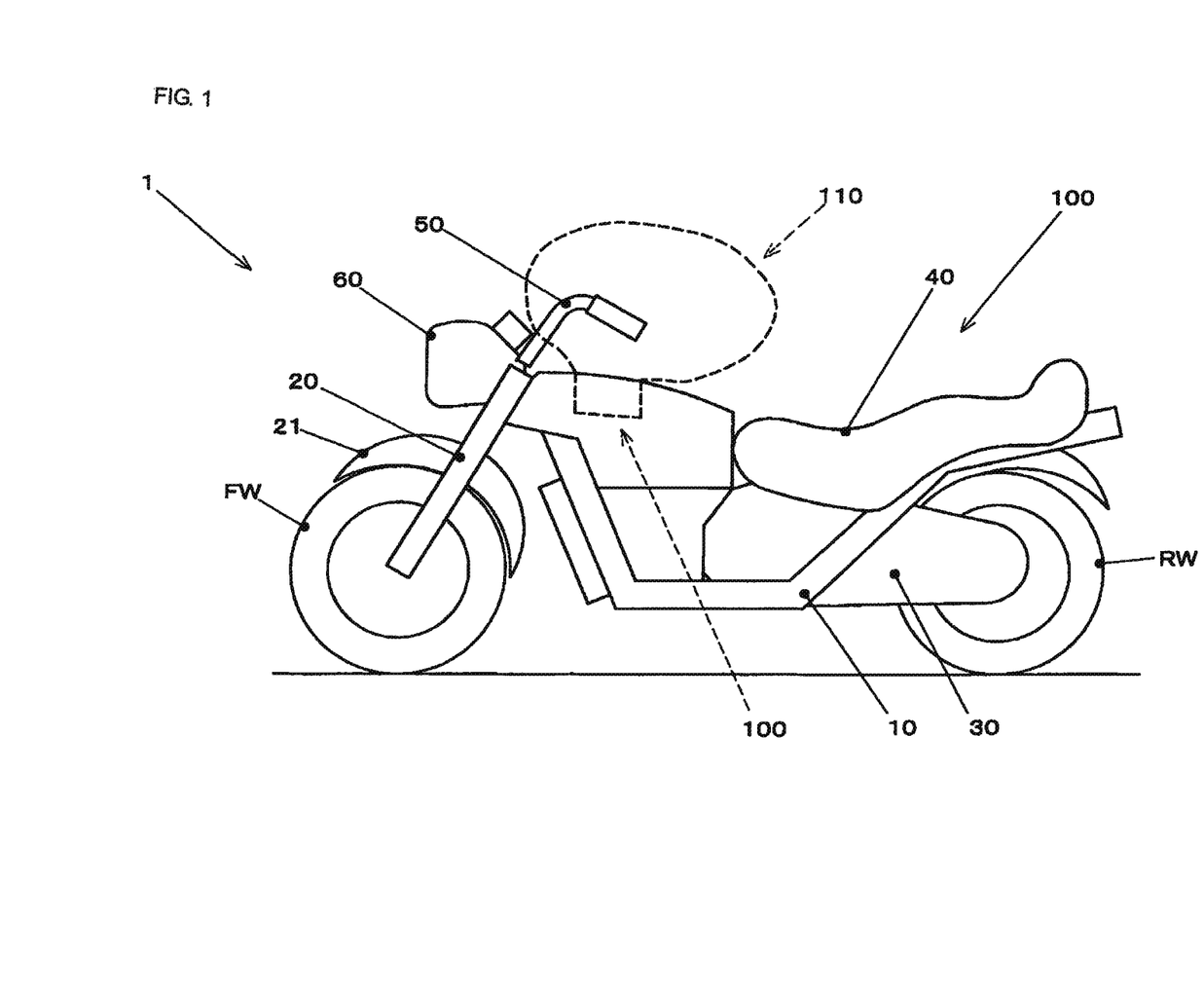
FIG. 1 is a schematic side view of a motorcycle having an embodiment of an airbag apparatus to which the present invention is applied.

FIG. 1 is a schematic side view of a motorcycle having the airbag apparatus of the embodiment.

The motorcycle 1 includes a front wheel FW, a rear wheel RW, a frame 10, a front fork 20, a swing arm 30, a seat 40, and a steering handle 50.

The frame 10 is a structural member provided in the center of the vehicle body, and an engine, a transmission, and accessories such as a cooling device and a fuel supply device (not shown) are mounted in the lower portion thereof.

The front fork 20 is a member that is rotatably mounted at the front end of the frame 10 and that supports the front wheel FW, a front brake, and the like.

The front fork 20 is a telescopic front suspension in which a spring and a damper are housed and that is extensible and compressible.

A front fender 21 is provided over the front wheel FW in the front fork 20.

The swing arm 30 is a member that is provided so as to protrude rearward from the lower portion of the frame 10 and is swingably mounted to the frame 10 and that supports the rear wheel RW.

A spring damper unit (not shown) of a rear suspension is provided between the swing arm 30 and the frame 10.

The seat 40 is a portion on which the occupant sits astride, and is provided on the top of the frame 10.

The steering handle 50 is an operating member that is formed so as to protrude from the top of the front fork 20 toward the rear of the vehicle and outward in the vehicle width direction and is gripped by the fingers of the occupant.

The steering handle 50 is provided with a front brake lever, a clutch lever, switches for various lights, and the like. The right-hand grip also serves as a throttle operating portion.

A headlight 60 is mounted to the center of the steering handle 50.

As shown in FIG. 1, the airbag module 100 is provided on the top of the vehicle body in front of the seat 40. The Airbag module 100 deploys and inflates the bag in front of the driver to receive and restrain the upper body of the driver at the time of a collision of the motorcycle 1 or the like.

Figure 2:
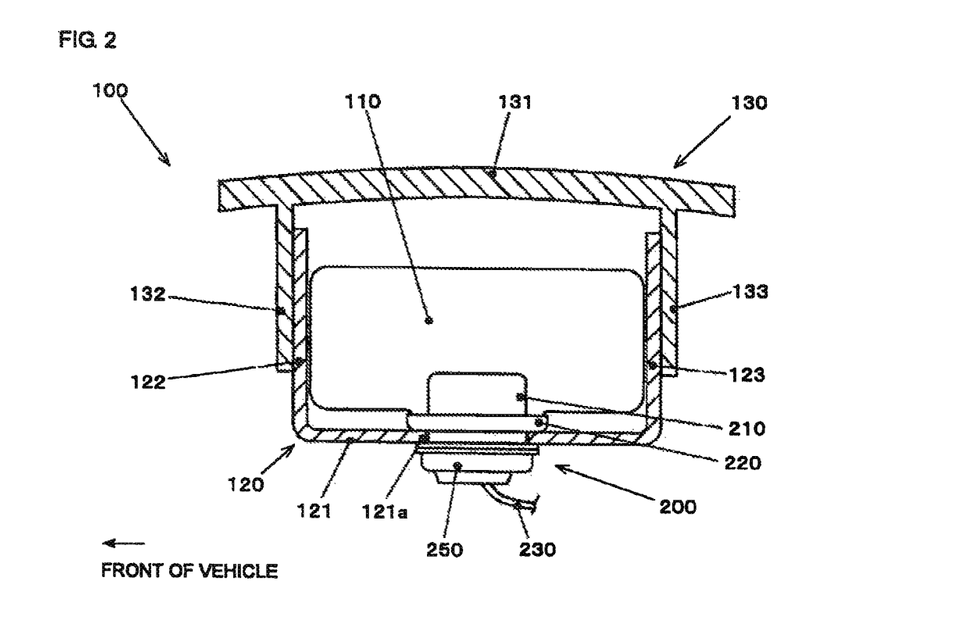
FIG. 2 is a schematic sectional view of an airbag module provided in the motorcycle of FIG. 1, and shows a state in which a lid is closed (a state before deployment and inflation of a bag portion).

FIG. 2 is a schematic sectional view of the airbag module 100, and is a diagram showing a state in which the lid is closed.

The airbag module 100 includes a bag 110, a retainer 120, a lid 130, and an inflator 200.

The bag 110 is formed in a bag shape by sewing or bonding base cloth panels together.

When not in use, the bag 110 is housed, for example, in a rolled or accordion-folded state, in the retainer 120.

If an airbag control device (not shown) detects a collision using a sensor provided, for example, in the front fork 20, the bag 110 is filled with gas for deployment by the inflator 200, thereby push-opens the lid 130, and deploys and inflates over the vehicle body and in the front of the occupant to restrain the upper body of the occupant.

The retainer 120 is formed in a box shape with its top open, for example, by combining sheet metal members made by pressing a steel sheet.

The bag 110 is fixed to the retainer 120, with the inlet facing the lower surface of the retainer 120, using a bag ring 220 of the inflator 200 to be described later.

The retainer 120 includes a lower surface portion 121, a front surface portion 122, a rear surface portion 123, and side surface portions (not shown).

The lower surface portion 121 is a substantially flat plate-like portion forming the bottom of the retainer 120.

As shown in FIG. 2, an opening 121a to which the inflator 200 is attached is formed in the lower surface portion 121.

The front surface portion 122 is a substantially flat plate-like portion formed so as to extend upward from the front end of the lower surface portion 121.

The rear surface portion 123 is a substantially flat plate-like portion formed so as to extend upward from the rear end of the lower surface portion 121.

The side surface portions are substantially flat plate-like portions formed so as to extend upward from the left and right ends of the lower surface portion 121, and the front ends and rear ends thereof are joined to the left and right ends of the front surface portion 122 and the rear surface portion 123, respectively.

The lid 130 is a lid-like member that covers the top of the retainer 120 when not in use. When the bag 110 deploys and inflates, the lid 130 rotates to open about a hinge disposed, for example, on the vehicle rear side thereof, and allows the bag 110 to deploy and inflate.

The lid 130 includes an upper surface portion 131, a front surface portion 132, and a rear surface portion 133 that are integrally formed, for example, of a resin material.

The upper surface portion 131 is a surface portion that substantially covers the upper opening of the retainer 120 when not in use.

The upper surface portion 131 functions as a decorative surface exposed on the outside of the vehicle.

The front surface portion 132 is a substantially plate-like surface portion protruding downward from the front end of the upper surface portion 131.

The front surface portion 132 is fixed to the front surface portion 122 of the retainer 120 using, for example, rivets (not shown).

A tear line (not shown) extending substantially along the vehicle width direction and formed like a groove so as to be smaller in thickness than the other portions is formed in the vicinity of the upper end of the front surface portion 132.

This tear line is a fragile portion that is broken by the pressing force that the upper surface portion 131 is subjected to from the bag 110 at the time of deployment and inflation of the bag 110.

When the lid 130 is opened, the part of the front surface portion 132 below the tear line remains on the retainer 120 side, and only the part above the tear line rotates and rises together with the upper surface portion 131.

The rear surface portion 133 is a substantially plate-like surface portion protruding downward from the rear end of the upper surface portion 131.

The rear surface portion 133 is fixed to the rear surface portion 123 of the retainer 120 using, for example, rivets.

A hinge portion (not shown) that bends when the lid 130 is opened is formed on the top of the rear surface portion 133 by reducing the thickness like a groove.

The inflator 200 generates gas for deployment that deploys and inflates the bag portion 100 when an airbag control unit (not shown) detects a vehicle collision.

The airbag control unit determines the vehicle collision, for example, when an acceleration sensor provided in the front fork 20 detects a deceleration greater than or equal to a predetermined threshold value.

Figure 3:
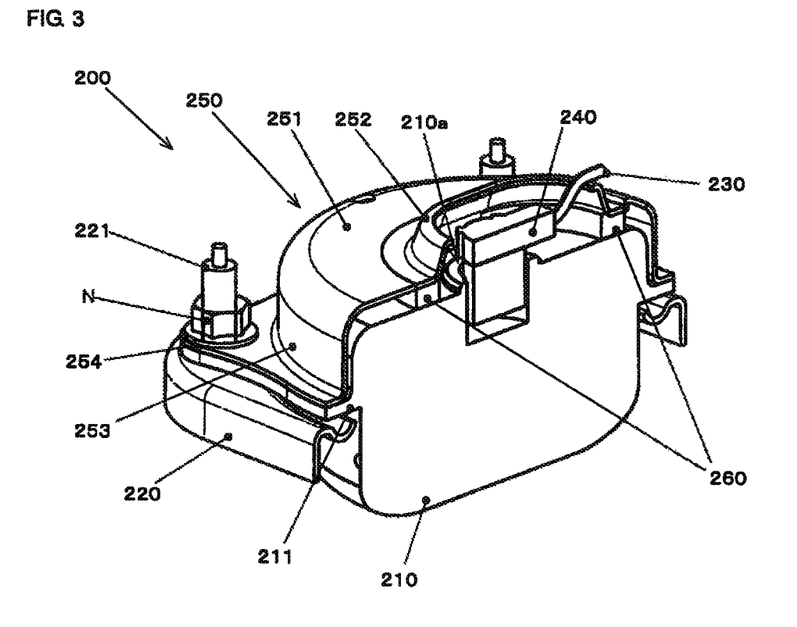
FIG. 3 is a partial sectional perspective view of an inflator provided in the airbag module of FIG. 2.

FIG. 3 is a partial sectional perspective view of the inflator 200.

Figure 4:
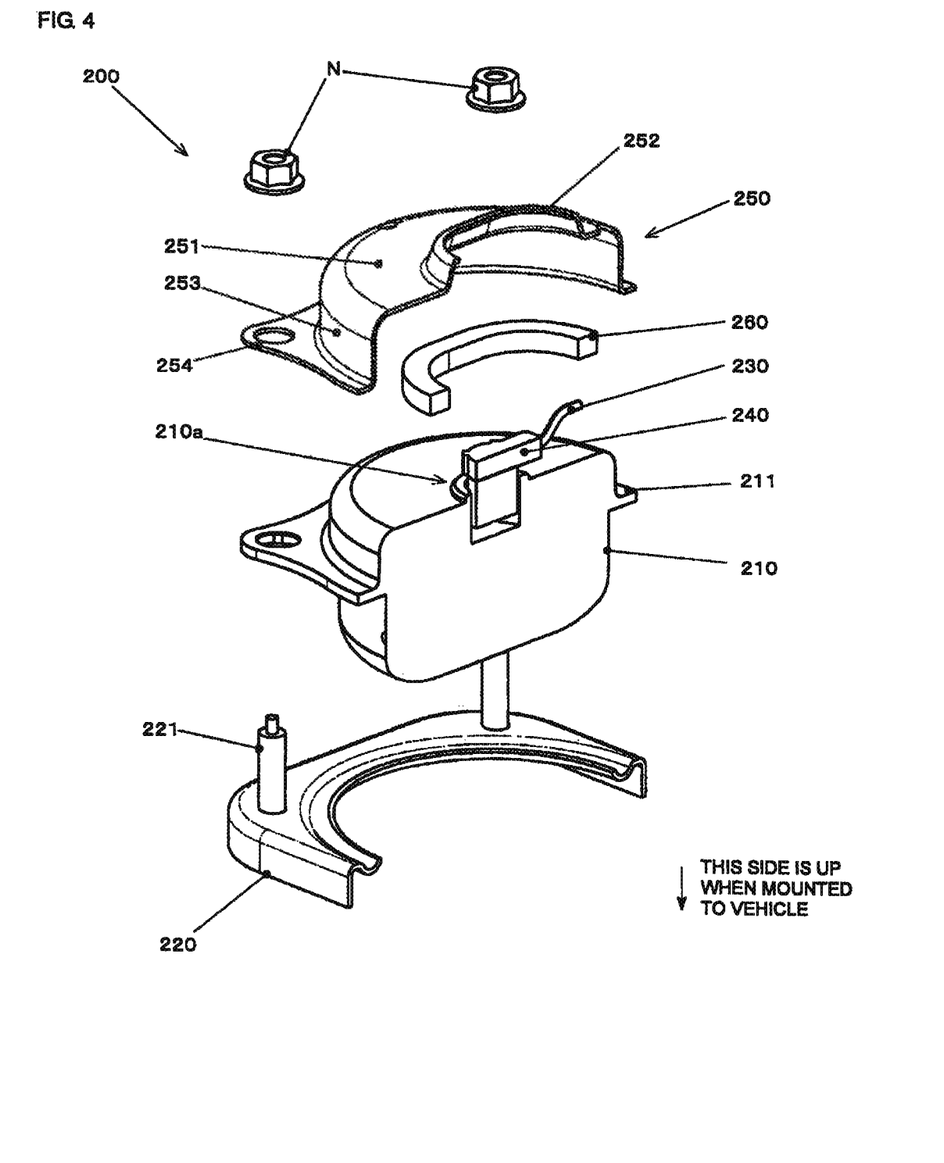
FIG. 4 is an exploded partial sectional perspective view of the inflator of FIG. 3.

FIG. 4 is an exploded partial sectional perspective view of the inflator 200.

Figure 5:
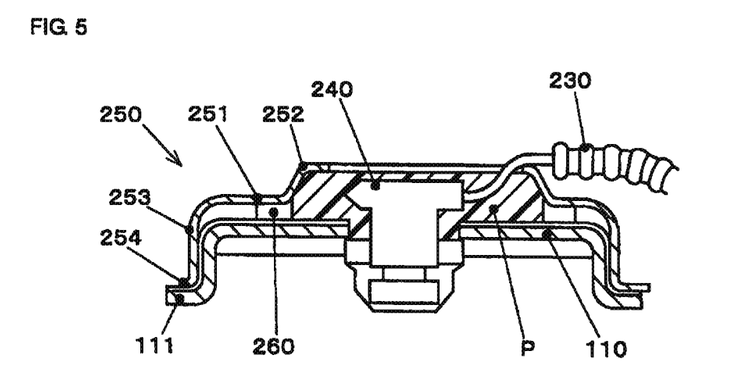
FIG. 5 is a sectional view of an area surrounding a connector after the filling of a potting material in the inflator of FIG. 3.

FIG. 3, FIG. 4, and FIG. 5 to be described later depict the inflator 200 upside down relative to its position when it is attached to the airbag module 100.

The inflator 200 includes a main body portion 210, a bag ring 220, a harness for distributing power 230, a connector 240, a cap 250, and a double-sided tape 260.

The main body portion 210 includes a housing formed in a substantially cylindrical shape, and a gas-generating agent and an initiator that causes the gas-generating agent to start gas generation housed in the housing.

The initiator has a reaction agent and an ignition device that causes the reaction agent to start reaction.

A flange 211 protruding to the outer diameter side like a flange is provided on the outer peripheral surface of the main body portion 210.

The bag ring 220 is a ring-shaped member serving as a base to which the bag 110 is attached.

The bag ring 220 is attached above (below in FIG. 3 and FIG. 4) the flange 211 of the main body portion 210. The part of the main body portion 210 above the flange 211 is inserted into the inner diameter side of the bag ring 220.

The bag ring 220 includes bolts 221 protruding downward (upward in FIG. 3 and FIG. 4).

The bolts 221 fasten the flange 211 of the main body portion 210 and the cap 250 with the lower surface portion 121 of the retainer 120 using nuts N.

The harness for distributing power 230 supplies power for ignition to the ignition device of the initiator in the main body portion 210, and is connected to the airbag control unit (not shown).

The connector 240 connects the harness for distributing power 230 and the initiator.

The connector 240 is coupled with an initiator side connector (not shown) provided in the opening 210a provided in the center of the lower surface (the upper surface in FIG. 3 and FIG. 4) of the main body portion 210.

The cap 250 is placed over the lower part of the main body portion 210 to cover this, and when a potting material P waterproofing the connector 240 is filled, it holds the potting material.

The cap 250 includes a planar portion 251, a protruding portion 252, a skirt portion 253, and a flange portion 254 integrally formed, for example, by pressing a steel sheet.

The cap 250 is coated in order to increase heat resistance, insulation properties, corrosion resistance, and the like.

The planar portion 251 is a flat plate-like surface portion facing the lower surface of the main body portion 210 at a predetermined distance therefrom. The outline of the planar portion 251 is formed in a circular shape slightly larger than the outer diameter of the main body portion 210.

The protruding portion 252 is a cylindrical portion protruding downward (upward in FIG. 3 and FIG. 4) from the center of the planar portion 251, and houses the connector 240.

The protruding portion 252 is formed such that the planar shape viewed from the cylinder axis direction of the main body portion 210 is, for example, an elliptical shape. The tip of the protruding portion 252 is open, and the harness for distributing power 230 is inserted through this opening into the cap 250.

The skirt portion 253 is a cylindrical portion protruding upward (upward in FIG. 3 and FIG. 4) from the outer peripheral edge of the planar portion 251.

The flange portion 254 is formed so as to protrude like a flange from the tip of the skirt portion 253 to the outer diameter side, and bolt holes through which the bolts 221 are passed are formed therein.

The double-sided tape 260 is disposed so as to be sandwiched between the opposite end faces of the planar portion 251 and the main body portion 210 to seal the potting material between them.

The double-sided tape 260 is formed by applying a bonding agent, an adhesive, or the like to both sides of a base material formed of a material having elasticity, and has a substantially rectangular cross-sectional shape.

The planar shape of the double-sided tape 260 viewed from the cylinder axial direction of the main body portion 210 is an elliptical shape larger than the protruding portion 252, and is disposed so as to surround the protruding portion 252 and the opening 210a of the main body portion 210 when the inflator 200 is viewed from below after its assembly.

The double-sided tape 260 is bonded or adheres to each of the planar portion 251 and the main body portion 210, and is held between them with the base material compressed.

In the inflator 200, the connector 240 is waterproofed by, after assembling the above-described members, filling a potting material such as urethane resin through the opening of the protruding portion 252, and then hardening the potting material.

FIG. 5 is a sectional view showing a state after the filling of the potting material.

The potting material P is filled into almost the entire region from the space between the planar portion 251 of the cap 250 and the main body portion 210 to the vicinity of the opening of the protruding portion 252 on the inner side of the double-sided tape 260.

At the time of this filling, the double-sided tape 260 serves as a seal that prevents the potting material from leaking and flowing to the outer diameter side thereof.

According to the present embodiment described above, the following effects can be obtained.

(1) The region filled with the potting material P is restricted by the housing surface of the main body portion 210 of the inflator 200, the cap 250, and the double-sided tape 260, the double-sided tape 260 reliably seals the contact portion between the housing and the cap, leakage at the time of the filling of the potting material P is thereby prevented, the waterproofing property of the product is ensured by appropriate potting, and the reliability and durability of the airbag apparatus can be ensured.

(2) Since the double-sided tape 260 is provided between the housing surface of the main body portion 210 and the cap 250, the main body portion 210 and the cap 250 can be temporarily fixed to each other at the time of assembly by the adhesive force of the double-sided tape 260, and the assembly workability is improved.

The technical scope of the present invention is not limited to the above-described embodiment, and may be appropriately changed. Examples of such changes include the following, which are also within the scope of the present invention.

(1) The airbag apparatus of the above-described embodiment is provided in a motorcycle as an example. The present invention is not limited to this, and can also be applied to other types of saddle-ride type vehicles such as ATVs.

(2) The shape, structure, material, manufacturing method, arrangement, and the like of each part forming the airbag apparatus are not limited to the above-described embodiment, and can be appropriately changed.

(3) In the above-described embodiment, the bag is deployed and inflated after a vehicle collision is detected. However, the present invention is not limited to this. The bag may be deployed and inflated in response to the detection of a precursor of a vehicle collision (pre-crash).

The invention claimed is:

1. An airbag apparatus comprising:
   a bag portion formed of a base cloth panel in a bag shape and deployed and inflated by being supplied with gas for deployment; and
   an inflator that generates the gas for deployment;
   wherein the inflator includes
   a gas-generating agent,
   an initiator that causes the gas-generating agent to start a gas-generating reaction,
   a housing that houses the gas-generating agent and the initiator,
   a harness for distributing power that supplies power to the initiator from the outside through an opening formed in the housing,
   a planar surface of the housing extending about the housing opening,
   a cap member having a planar portion and being fastened to the housing so that the cap member planar portion faces the planar surface of the housing and is spaced by a predetermined distance therefrom to form a gap therebetween,
   an annular elastic member disposed in the gap so as to surround the opening and so as to be sandwiched between said planar surface of the housing and said planar portion of the cap member, and
   a potting material filled in the gap between the housing planar surface and the cap member planar portion on the inner side of the elastic member,
   and wherein the elastic member is a double-sided tape formed by applying a bonding agent or an adhesive to the housing side surface and the cap member side surface of a base material formed of a material having elasticity to keep the housing and the cap member together prior to being fastening together and to keep the potting material from leaking outwardly beyond the double-sided tape.

2. The airbag apparatus of claim 1 wherein the harness has a connector received in the housing opening with the potting material providing waterproofing for the connector.

* * * * *